United States Patent
Kuppuswamy et al.

(10) Patent No.: US 7,970,611 B2
(45) Date of Patent: Jun. 28, 2011

(54) SPEAKER AUTHENTICATION IN DIGITAL COMMUNICATION NETWORKS

(75) Inventors: Raja Kuppuswamy, Gauting (DE); Christian S Pilz, München (DE)

(73) Assignee: Voice.Trust AG, Munich (DE)

( * ) Notice: Subject to any disclaimer, the term of this patent is extended or adjusted under 35 U.S.C. 154(b) by 1306 days.

(21) Appl. No.: 11/416,793

(22) Filed: May 2, 2006

(65) Prior Publication Data

US 2007/0233483 A1 Oct. 4, 2007

(30) Foreign Application Priority Data

Apr. 3, 2006 (EP) .................................. 06007054

(51) Int. Cl.
*G10L 17/00* (2006.01)
(52) U.S. Cl. ........................ 704/247; 704/252
(58) Field of Classification Search .................. 704/247, 704/252
See application file for complete search history.

(56) References Cited

U.S. PATENT DOCUMENTS

| | | | | |
|---|---|---|---|---|
| 5,950,157 A * | 9/1999 | Heck et al. | | 704/234 |
| 5,995,927 A * | 11/1999 | Li | | 704/246 |
| 6,038,528 A * | 3/2000 | Mammone et al. | | 704/203 |
| 6,253,179 B1 * | 6/2001 | Beigi et al. | | 704/243 |
| 6,272,463 B1 * | 8/2001 | Lapere | | 704/248 |
| 6,539,352 B1 * | 3/2003 | Sharma et al. | | 704/249 |
| 6,697,778 B1 * | 2/2004 | Kuhn et al. | | 704/243 |
| 2003/0009333 A1 | 1/2003 | Sharma et al. | | |
| 2003/0033143 A1 | 2/2003 | Aronowitz | | |
| 2006/0136219 A1* | 6/2006 | Wang | | 704/273 |
| 2007/0136063 A1* | 6/2007 | Grost et al. | | 704/254 |
| 2007/0239441 A1* | 10/2007 | Navratil et al. | | 704/225 |

FOREIGN PATENT DOCUMENTS

EP 0874354 B1 10/1998

* cited by examiner

*Primary Examiner* — Jakieda R Jackson
(74) *Attorney, Agent, or Firm* — Black, Lowe & Graham, PLLC

(57) ABSTRACT

Example embodiments provide a speaker authentication technology that compensates for mismatches between enrollment process conditions and test process conditions using correction parameters or correction models, which allow for correcting one of the test voice characterizing parameter set and the enrollment voice characterizing parameter set according to a mismatch between the test process conditions and the enrollment process conditions, thereby obtaining values for the test voice characterizing parameter set and the enrollment voice characterizing parameter set that are based on the same or at least similar process conditions. Alternatively, each of the enrollment and test voice characterizing parameter sets may be normalized to predetermined standard process conditions by using the correction parameters or correction models.

34 Claims, 6 Drawing Sheets

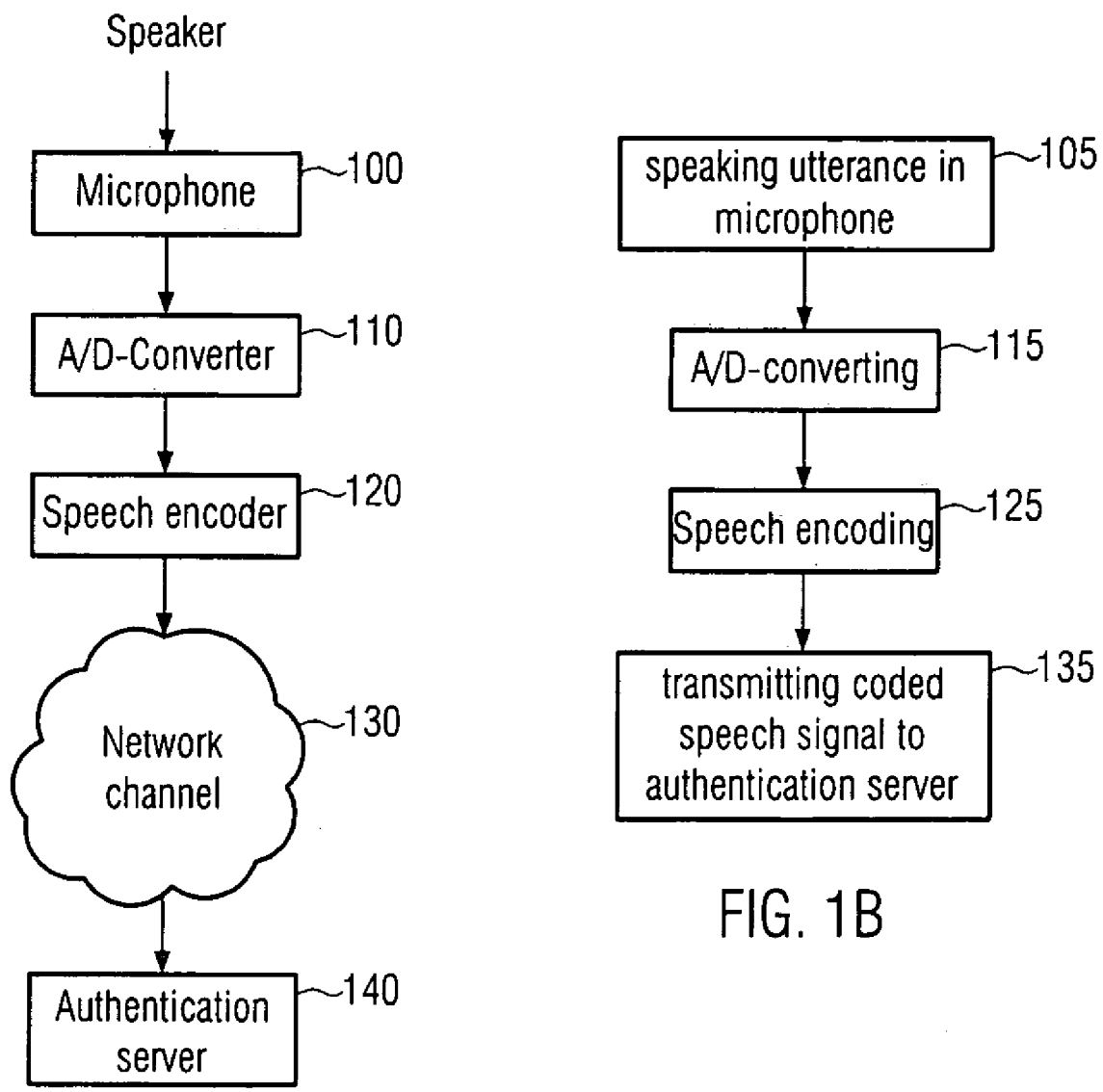

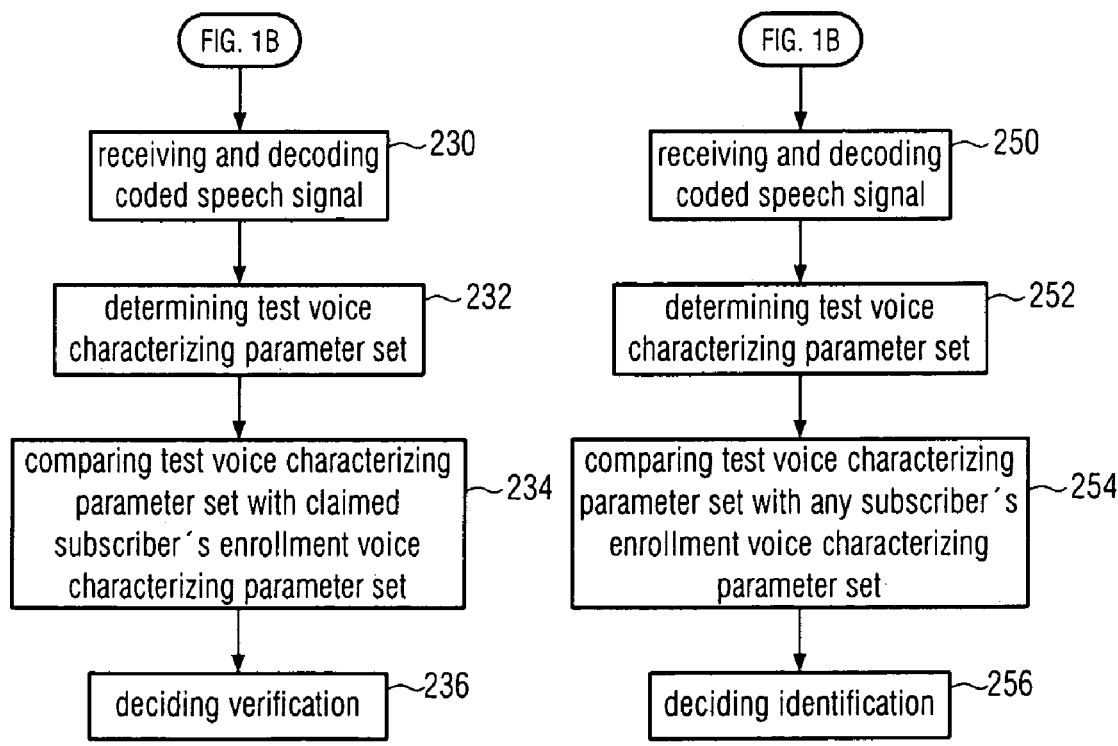

SPEAKER AUTHENTICATION IN DIGITAL COMMUNICATION NETWORKS

TECHNICAL FIELD

The present disclosure generally relates to speaker authentication in digital communication networks, and, more particularly, to speaker authentication over packet switched/mobile networks

BACKGROUND

Today, the combination of wireless communication, phone and Internet offers consumers access to many different services. In particular, modern communication technology and networks enable a user to access services which are associated with the identity of the user, such as banking services, telephone services, home video provision services, auction services, broking services or medical services. Therefore, it becomes increasingly important to verify that an individual, often referred to as "claimant", who requests access to certain services, is in fact a certain subscriber authorized to access said certain services.

Typically, a customer requesting access to a certain service is requested to provide a subscriber name and a personal identification number (PIN) prior to obtaining access to said service. Then, it is decided whether or not the customer requesting access to said certain service is really a subscriber of said service by comparing the PIN provided by the customer with a PIN associated with the subscriber name and stored in a database of a server providing the requested service.

Although such PIN based methods are widely used, they are susceptible to deception, as any imposter gaining knowledge about a subscriber's name and PIN is able to deceive a service access security mechanism by requesting access to the service in the name of said subscriber and providing said subscriber's PIN, thereby obtaining access to the service in said subscriber's name.

Therefore, there exists an increasing interest in improved security technologies such as biometric based technologies, in which a person's identity is verified by one or more of his/her personal biological characteristics including fingerprints, eye retinas and irises, facial patterns and voice. For services based on digital communication, voice-based security technologies are particularly attractive, as the infrastructure and hardware to implement voice-based security technologies already exist in today's digital communication networks. Therefore, voice-based security mechanisms such as speaker authentication technologies can be implemented cost effectively, leading to a growing demand for such speaker authentication technology solutions.

BRIEF DESCRIPTION OF THE DRAWINGS

The accompanying drawings are incorporated into and form a part of the specification. The drawings are not to be construed as limiting the invention to only the illustrated and described examples of how the technology can be made and used. Further features and advantages will become apparent from the following and more particular description, as illustrated in the accompanying drawings.

FIG. 1A represents a block diagram illustrating the components of a transmission channel for transmitting a spoken utterance from a speaker to an authentication server.

FIG. 1B represents a flow diagram illustrating the transmission of a spoken utterance from a speaker to an authentication server.

FIG. 2A represents a flow diagram illustrating an enrollment process in an authentication server.

FIG. 2B represents a flow diagram illustrating a test process for speaker verification in an authentication server.

FIG. 2C represents a flow diagram illustrating a test process for speaker identification in an authentication server.

DETAILED DESCRIPTION

Figure 3A:
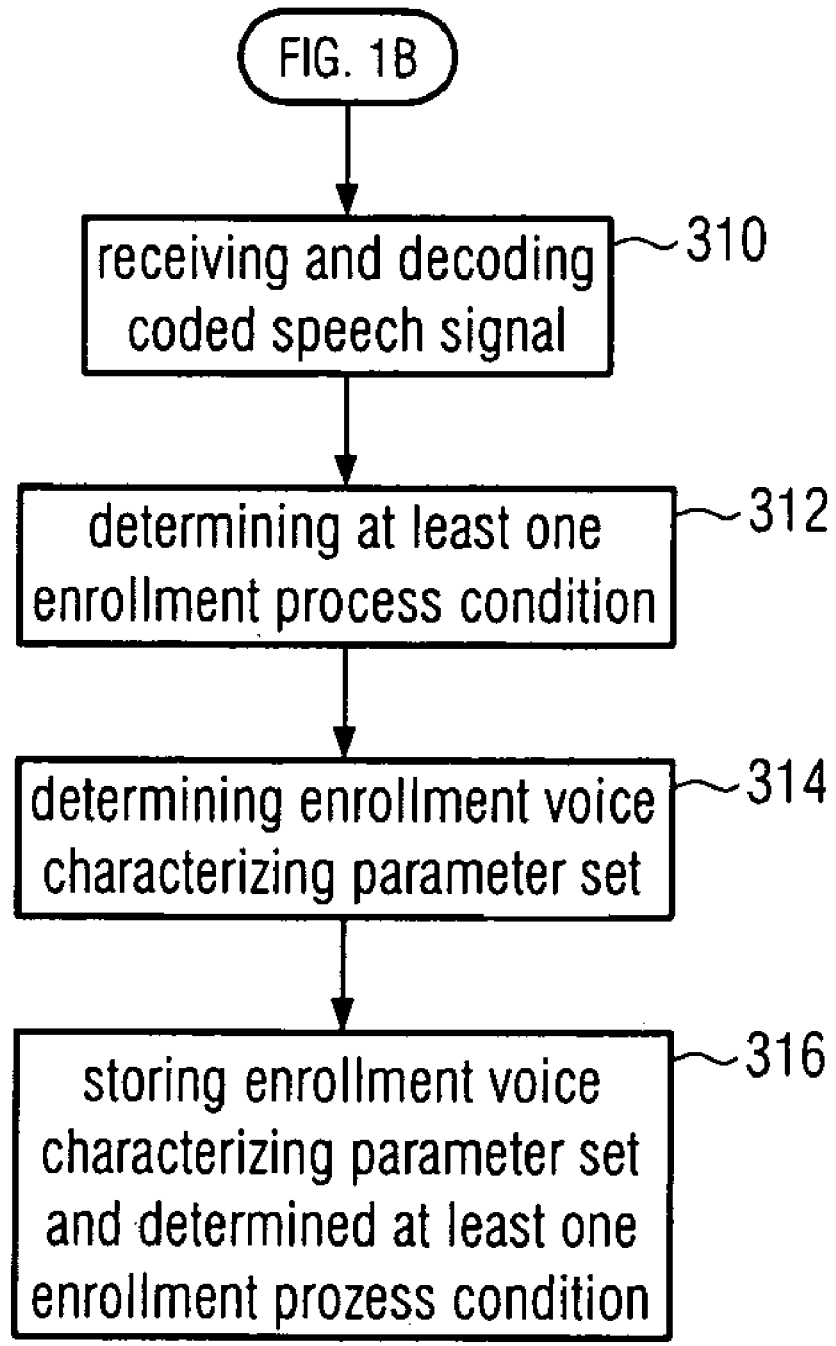
FIG. 3A represents a flow diagram illustrating an exemplary enrollment process in an authentication server in accordance with an exemplary embodiment.

Embodiments described herein provide enhanced computer- and network-based methods, systems, and techniques for speaker authentication. As described in detail herein, example embodiments provide techniques that facilitate reliable speaker authentication in a digital communication network environment and in particular in a mobile or IP network environment. For example, reliable speaker authentication may be performed as described herein by compensating for mismatches that typically occur between conditions relating to a speaker providing identification data and conditions relating to a speaker seeking to be verified by using correction parameters or correction models.

The authentication methods, systems, and techniques (hereinafter referred to generally as techniques) incorporate stored correction parameters or correction models that allow for correcting one of a test voice characterizing parameter set and/or a enrollment voice characterizing parameter set according to a mismatch between the test process conditions and the enrollment process conditions or for normalizing the voice characterizing parameter sets to standard process conditions. This allows the techniques to obtain values for the test voice characterizing parameter set and the enrollment voice characterizing parameter set which are based on the same or at least similar process conditions.

In one embodiment, the digital communication network is a packet switched network employing a voice over IP (VoIP) protocol or a mobile network.

Generally, speaker authentication is performed by analyzing a speech signal representing a sample of a person's speech, extracting certain acoustic features of said sample, and comparing said features with personalized features stored in a database.

In speaker authentication, it can be differentiated between speaker identification and speaker verification. Speaker identification is the process of determining to which one of N stored speaker references a provided voice sample can be assigned. Therefore, speaker identification can be regarded as a 1:N decision.

In the case of speaker verification, it is determined whether or not an identity claimed by a speaker corresponds to the actual identity of the speaker. Typically, a speaker claims a certain user identity by providing a user identifier (for example by speaking numbers, inputting passwords, or inserting a chip card with the identifier stored thereon), and then it is determined by analyzing a speech sample provided by the speaker whether or not his speech characteristics match up with stored speech reference characteristics of the claimed user. Therefore, the verification task can be regarded as a 1:1 decision.

Furthermore, speaker authentication systems can be distinguished as text dependent systems and text independent systems. In text dependent systems, the system prompts a speaker to repeat a predetermined text sample after claiming his identity. However, such systems suffer from the problem that an imposter is able to secretly record a speaker during accessing a voice protected service, and then to misuse the recorded voice sample for accessing the voice protected service by claiming to be the speaker from which the voice sample has been recorded. Text independent systems alleviate this problem as they do not have any text related constraints and allow free text to be used.

Generally, speaker authentication technologies comprise two different phases. The first one is referred to as "enrollment", during which a reference template or model is derived for a certain speaker by one or more speech samples provided by the speaker during a training session. The second one is referred to as "test", during which a speech sample of a speaker claiming a certain identity is analyzed and compared with the reference template or model of the enrolled claimed identity.

In more detail, a subscriber to an authentication server provides the authentication server during enrollment with several speech samples, hereinafter referred to as "utterances", to enable the authentication server to establish a reference model such as a reference template, a reference voice feature set or a reference speaker model for said subscriber, including subscriber specific values for the model related parameters, hereinafter referred to as "enrollment voice characterizing parameter set". Then, during test phase, a speaker who claims to be a certain subscriber, hereinafter referred to as "claimant", provides the authentication server with an utterance, from which characteristic voice features and values for model related parameters, hereinafter referred to as "test voice characterizing parameter set", are derived. Then, authentication is performed based on a comparison between the test voice characterizing parameter set of the claimant and the enrollment voice characterizing parameter set of the certain subscriber the claimant claims to be.

However, as the conditions during test process, hereinafter referred to as "test process conditions", usually do not exactly match the conditions during the enrollment process, hereinafter referred to as "enrollment process conditions", a difference between the enrollment voice characterizing parameter set and the test voice characterizing parameter set already exists due to a mismatch between the enrollment process conditions and the test process conditions, even if the claimant is in fact the claimed subscriber. As a consequence, if a mismatch between enrollment and test process conditions causes a difference between the enrollment and test voice characterizing parameter sets which exceeds a certain threshold, the authentication server is no longer able to correctly authenticate a certain subscriber.

There are many reasons for differing enrollment and test conditions. For example, a subscriber may use different end devices when accessing the authentication server for enrollment and test, such as a headset connected to the subscriber's computer during the enrollment process and a handset e.g., mobile phone during the test process. Furthermore, a headset used during enrollment may become damaged and therefore replaced with a new headset which is then used during a next test process. The problem with such different end devices used by the subscriber is that they are all equipped with different microphones for converting an acoustic utterance spoken by the subscriber into an electric speech signal, whereby each microphone has its own specific characteristics. These different characteristics lead to different electric signals when converting a same spoken utterance. Furthermore, in digital communications the electric speech signals are converted to digital signals by using an analog-to-digital (A/D) converter, and the digital speech signals are encoded by a certain speech encoder prior to be transmitted over a network channel. Again, each A/D converter has its own specific characteristics, for example, a certain signal-to-noise ratio (SNR), and also each speech encoder has its own specific properties, and therefore a resulting coded speech signal may be different if a subscriber uses different hardware configurations for providing speech samples to the authentication server. Also, a speaker's physical and mental condition as well as the Lombard effect influence a spoken utterance and therefore a resulting encoded speech signal.

A further influencing factor which affects a voice characterizing parameter set extracted from a coded speech signal transmitted and received over a network channel arises from the current network channel properties during transmission of the coded speech signal. Particularly, mobile networks and internet protocol (IP) networks are problematic for real-time applications such as a typical voice authentication request, as it is not possible to assume a fixed quality of service in such mobile or IP networks due to a limited and/or changing bandwidth of a current network channel. In addition, packet based networks like the Internet suffer from packet loss and jitter effects. For these reasons, compared to connection orientated fixed line networks, digital speech signals in a mobile or IP network environment are usually encoded with a lower bit rate and/or a channel adapted bit rate. However, different speech encoding bit rates greatly influence the resulting coded speech signal and finally the voice characterizing parameter set extracted from the transmitted and received coded speech signal, thereby leading to difficulties for speaker authentication technologies.

Illustrative embodiments will be described with reference to the figure drawings.

FIG. 1A illustrates the components involved in transmitting a spoken utterance from a speaker to an authentication server, and FIG. 1B illustrates the corresponding method steps.

In step 105, a speaker speaks an utterance into a microphone 100 which converts the spoken acoustic utterance into an analog electric speech signal. Then, an A/D converter 110 converts the analog electric speech signal into a digital speech signal in step 115. A speech encoder 120 encodes the digital speech signal in step 125. For speech encoding, for example, speech codes standardized by the European Telecommunications Standards Institute (ETSI), such as the GSM adaptive multirate scheme, or standardized by the International Telecommunication Union (ITU), such as G.711, G.722 and G.729, are used. The coded speech signal may be further encoded by a channel encoder for increasing the transmission reliability. In step 135, the coded speech signal is transmitted over a network channel 130 of a digital communication network to an authentication server 140.

In the authentication server 140, the further processing depends on whether the current process is an enrollment process for enrolling a new subscriber in the authentication server, a test process for verifying whether a claimant corresponds to a claimed subscriber to the authentication server, or a test process for identifying one of a plurality of subscribers to the authentication server to which the spoken utterance belongs.

FIG. 2A illustrates an enrollment process for enrolling the speaker which provided the spoken utterance in step 105 in the authentication server 140. In step 210, the authentication server 140 receives and decodes the coded speech signal. Then, the authentication server 140 determines an enrollment voice characterizing parameter set from the received and decoded speech signal in step 212. The determined enrollment voice characterizing parameter set may be a voice feature set of acoustic features specific to the spoken utterance represented by the decoded speech signal. A voice feature set of acoustic features may result from a spectral analysis of the spoken utterance. Furthermore, the enrollment voice characterizing parameter set can also represent a set of model parameters for adapting a common speaker model to a certain speaker. Finally, the determined enrollment voice characterizing parameter set is stored in a data repository such as a database in step 214.

Note that for the purposes of this description, any mechanism for implementing a data repository may be used. For example, a data repository may be stored as a database, a file, or any other equivalent data structure.

FIG. 2B illustrates the case in which the authentication server 140 is used for determining whether the speaker, i.e. the claimant really corresponds to a certain subscriber the claimant claims to be. In step 230, the authentication server 140 receives and decodes the coded speech signal. Then, the authentication server 140 determines a test voice characterizing parameter set from the decoded speech signal in step 232. Like the enrollment voice characterizing parameter set, the test voice characterizing parameter set can be a voice feature set of acoustic features specific to the spoken utterance, or a set of model parameters for a speaker model. Then, in step 234, the test voice characterizing parameter set of the claimant is compared with the stored enrollment voice characterizing parameter set of the certain subscriber the claimant claims to be. Based on the results of this comparison, the authentication server 140 decides in step 236 whether the claimant corresponds to the claimed subscriber.

The process in the case of speaker identification by the authentication server 140 is illustrated in FIG. 2C. Steps 250 and 252 correspond to steps 230 and 232 of FIG. 2B. Then, in step 254, the test voice characterizing parameter set of the speaker who has spoken the utterance in step 105 is compared with any stored enrollment voice characterizing parameter set. Based on the comparison of the results, it is decided in step 256 that the subscriber whose stored enrollment voice characterizing parameter set matches best with the speaker's test voice characterizing parameter set corresponds to the speaker. If none of the stored enrollment voice characterizing parameter sets matches the speaker's test voice characterizing parameter set in a manner which lies above a certain threshold, it is decided that the speaker does not correspond to any of the subscribers to the authentication server.

As indicated above, present speaker authentication technology suffers from the problem of different process conditions occurring during the enrollment process and the test process. The techniques described herein compensate for such mismatches between enrollment process conditions and test process conditions by using correction parameters or correction models stored in a data repository, wherein the correction parameters or correction models allow for correcting one of the test voice characterizing parameter set and the enrollment voice characterizing parameter set according to a mismatch between the test process conditions and the enrollment process conditions, thereby obtaining values for the test voice characterizing parameter set and the enrollment voice characterizing parameter set which are based on the same or at least similar process conditions. Alternatively, each of the enrollment and test voice characterizing parameter sets may be normalized to predetermined standard process conditions by using the correction parameters or correction models.

FIG. 3A illustrates an exemplary enrollment process in an authentication server according to an exemplary embodiment. In step 310, the authentication server receives and decodes the coded speech signal. Then, in step 312, at least one enrollment process condition is determined by the authentication server. In one embodiment, the authentication server receives the at least one enrollment process condition together with the speech signal. In another embodiment, the authentication server determines at least one test process condition such as a coding rate used for encoding the speech signal from an analysis of the received and decoded speech signal. Furthermore, the current network channel can be monitored and analyzed to determine or estimate a test process condition. In another embodiment, the enrollment process conditions are specified by the authentication server, and a prospective new subscriber has to assure the specified conditions. For example, it can be specified that a certain codec with a given coding rate has to be used for the enrollment process in step 125. For example, this can be assured by a prospective subscriber by using a wired digital communication network for the enrollment process. Furthermore, an enrollment voice characterizing parameter set is determined from the decoded speech signal in step 314. Then, the determined enrollment voice characterizing parameter set is stored together with the determined at least one enrollment process condition in a database of the authentication server in step 316.

Figure 3B:
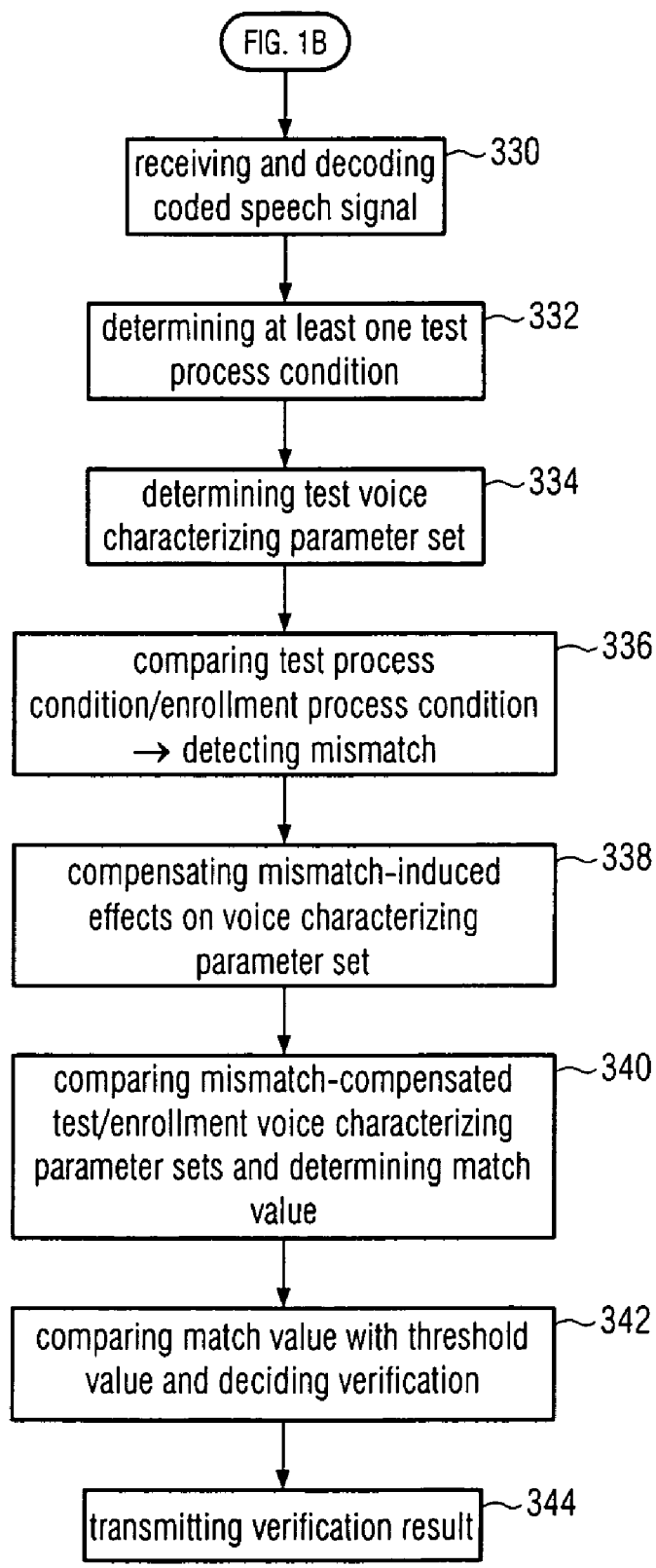
FIG. 3B represents a flow diagram illustrating an exemplary test process for speaker verification in an authentication server in accordance with an exemplary embodiment.

FIG. 3B shows an exemplary testing process for verifying whether a speaker, i.e., a claimant, corresponds to a claimed subscriber according to a preferred embodiment of the present invention. In step 330, the authentication server receives and decodes the coded speech signal. Then, at least one test process condition is determined by the authentication server in step 332. In one embodiment, the at least one test process condition is received together with the coded speech signal. The at least one test process condition may be determined by analyzing the received information. For example, at least one test process condition may comprise one or more of a handset/headset label indicating the handset/headset used by the claimant during speaking the at least one test utterance, a SNR of an analog/digital converter used for converting the at least one spoken test utterance to the speech signal, and/or a bit rate used by an encoder for encoding the speech signal. In another embodiment, at least one test process condition is determined by an analysis of the received speech signal and/or an analysis of the current network channel. For example, a bit rate used for coding the speech signal may be determined, or a black box model out of a plurality of models for modeling combined influences of different test process conditions on a speech signal may be selected in accordance with the analysis of the received coded speech signal. Or, for example, a black box model from which the at least one process condition can be derived may be determined by monitoring a current network channel and analyzing the received coded speech signal.

In step 334, a test voice characterizing parameter set is determined. Then, the determined at least one test process condition is compared with the respective stored at least one enrollment process condition in step 336, and in the case of mismatch between the at least one test process condition and the at least one enrollment process condition, said mismatch is compensated in step 338 by using the correction parameters stored in the second database and related to a mismatch value of the detected mismatch.

In the second database, different correction parameters are stored for different mismatch values concerning the at least one process condition. In one embodiment, different sets of correction parameters are stored for different combinations of mismatch values for different process conditions. According to a further embodiment, the different sets of correction parameters are used for different correction models for compensating combined influences of different process conditions. These correction parameters/correction models were selected to best correspond to the detected mismatch, i.e. the mismatch value or combination of mismatch values with regard to the at least one process condition. Furthermore, the correction values/correction models may result from training sessions for different process conditions or combinations of process conditions.

In one embodiment, the correction parameters are used for correcting the determined test voice characterizing parameter set. Then, the corrected test voice characterizing parameter set is compared with the enrollment voice characterizing parameter set of said subscriber the claimant claims to be, and a match value between the corrected test voice characterizing parameter set and the enrollment voice characterizing parameter set is determined in step 340. The determined match value is then compared with a predetermined verification threshold value to decide whether or not the claimant corresponds to the certain subscriber the claimant claims to be in step 342.

In another embodiment, the correction parameters are used for correcting the stored enrollment voice characterizing parameter set. Then, the corrected enrollment voice characterizing parameter set is compared with the test voice characterizing parameter set of the claimant, and a match value between the corrected enrollment voice characterizing parameter set and the test voice characterizing parameter set is determined in step 340. The determined match value is then compared with a predetermined verification threshold value to decide whether or not the claimant corresponds to the certain subscriber the claimant claims to be in step 342.

As mentioned, the voice characterizing parameter sets may represent a voice feature set of acoustic features extracted from at least one utterance, or the voice characterizing parameter set may represent a set of model parameters of a speaker model derived from at least one utterance. Also, the request for transmitting the coded speech signal may indicate one or more words to be spoken for the test utterance, wherein the one or more words may correspond to one or more words spoken for the enrollment utterance, or wherein the one or more words are randomly selected by the authentication server between one or more words spoken for the enrollment utterance, or wherein the one or more words are randomly generated by the authentication server. In one embodiment, the at least one spoken test utterance is randomly chosen by the claimant. Also, the one or more words spoken for the enrollment utterance may be provided by the authentication server or may be randomly chosen by the claimant.

After deciding on the verification in step 342, the verification result can be transmitted to the entity which initiated the verification process. This entity can be for example a computer from which the claimant tries to access a certain software application installed thereon for which an user authentication is necessary which assures that the claimant corresponds to a certain subscriber authorized to access the software application. In this case, a request message for verifying the claimant is transmitted from the claimant's computer to the authentication server, the request message including an indication of the certain subscriber the claimant claims to be. After receiving said request message, the authentication server sends to the claimant's computer a request message requesting the claimant to provide a speech sample by speaking an utterance into a microphone connected with the computer, thereby arriving at step 105 of FIG. 1B which leads to the above described verification process. After determining the claimant verification, a verification result message is transmitted from the authentication server to the claimant's computer. If the verification result message indicates a positive verification result, the claimant is allowed to access the certain software application. Otherwise, if the verification result message indicates a negative verification result, the claimant is not allowed to access the certain software application.

As another example, this entity can be a computer in a local area network (LAN), wherein the claimant tries for example to get access to a certain application provided by an application server of the LAN, wherein only authorized users are allowed to access the certain application. Therefore, after receiving the request for accessing the certain application from the claimant, the application server sends to the authentication server a request message requesting verification of the claimant, the request message indicating a certain user the claimant claims to be. After receiving said request message, the authentication server sends to the claimant's computer a request message requesting the claimant to provide a speech sample by speaking an utterance into a microphone connected with the computer, thereby arriving at step 105 of FIG. 1B which leads to the above described verification process. After determining the claimant verification, a verification result message is transmitted from the authentication server to the application server. If the verification result message indicates a positive verification result, the claimant is allowed to access the certain application. Otherwise, if the verification result message indicates a negative verification result, the claimant is not allowed to access the certain application.

As a further example, the entity requesting verification can be a handheld device, for example a mobile phone of the claimant over which the claimant tries to get access to a certain service provided by a service provider in a digital communication network, wherein only certain subscribers are allowed to access said certain service. After receiving the request for accessing said certain service from the claimant, the service provider sends a request message requesting verification of the claimant to the authentication server, the request message indicating a certain subscriber the claimant claims to be. After receiving said request message, the authentication server sends a request message to the claimant's handheld device requesting the claimant to provide a speech sample by speaking an utterance into a microphone of the handheld device, thereby arriving at step 105 of FIG. 1B which leads to the above described verification process. After deciding about the claimant verification, a verification result message is transmitted from the authentication server to the service provider. If the verification result message indicates a positive verification result, the claimant is allowed to access the requested service provided by the service provider. Otherwise, if the verification result message indicates a negative verification result, the claimant is not allowed to access the requested service.

For example, an authentication server may receive from a first remote device a request for using the authentication server to verify whether or not the claimant matches with the certain subscriber the claimant claims to be, together with a network address of a second remote device. The server then sends to the network address of the second remote device a request for transmitting the coded speech signal. The authentication server may then transmit to the requesting remote device an indication of whether or not it is verified that the claimant matches with the certain subscriber the claimant claims to be.

Furthermore, it is also possible that a claimant's end device such as a computer or mobile phone directly transmits a verification request to the authentication server, which then sends the verification result to an application server or service provider from which the claimant wishes to get access to a certain application or service.

To further improve the security, the above described techniques can also be enhanced with a pass phrase mechanism. For example, in the enrollment process, one or more personal pass phrases could be provided and associated with the subscriber to be enrolled. Then, a later verification request could also include at least one pass phrase provided by the claimant, and then the authentication server can determine whether or not the at least one pass phrase provided by the claimant corresponds to the at least one personal pass phrase associated with the certain subscriber the claimant claims to be. Preferably, the authentication server proceeds with the authentication method only if the provided at least one pass phrase matches the stored at least one pass phrase. For example, a pass phrase may be a numeric personal identification number (PIN), an alphanumeric PIN or a password comprised of a character string.

Figure 3C:
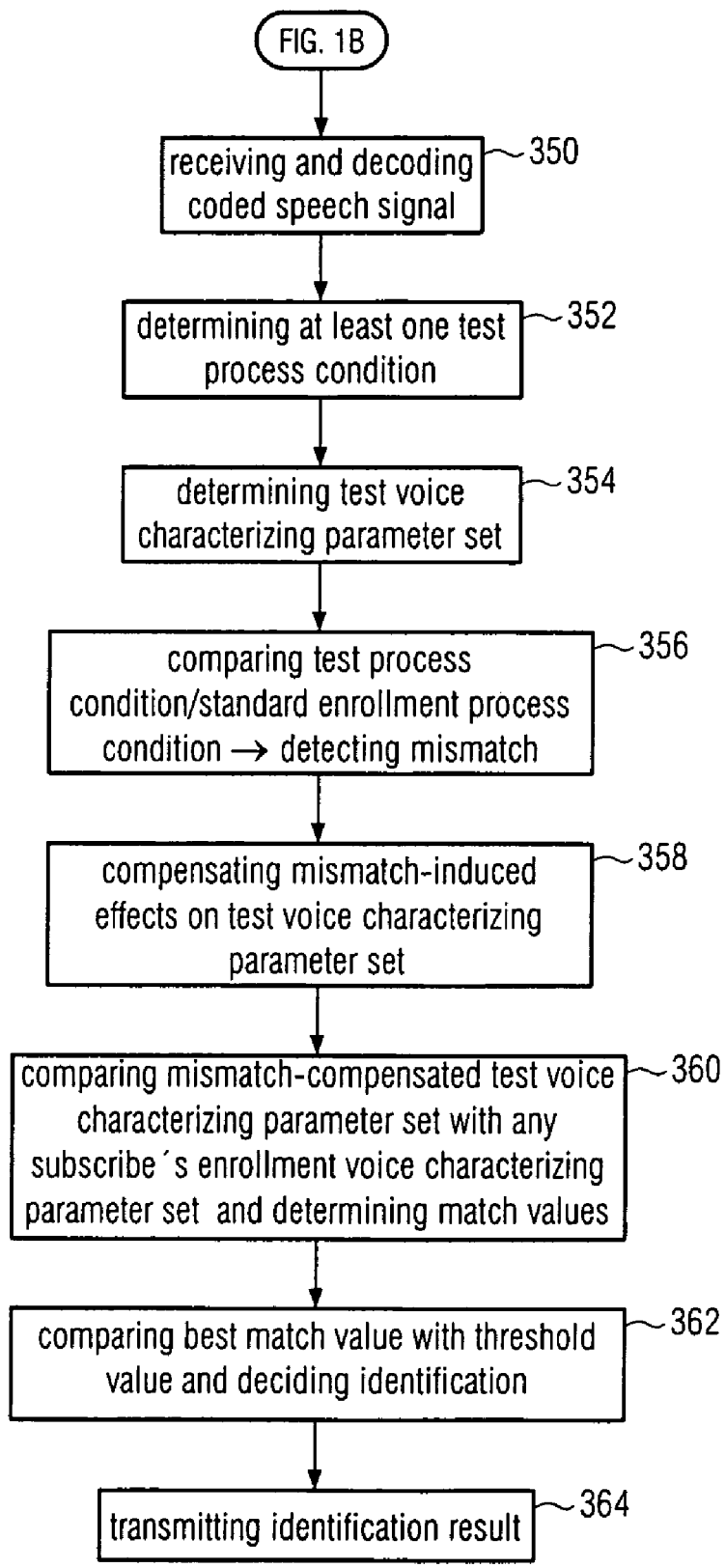
FIG. 3C represents a flow diagram illustrating an exemplary test process for speaker identification in an authentication server in accordance with an exemplary embodiment.

FIG. 3C shows an exemplary testing process for identifying a certain speaker according to an exemplary embodiment. In step 350, the authentication server receives and decodes the coded speech signal. Then, at least one test process condition is determined by the authentication server in step 352. In a preferred embodiment, the at least one test process condition is received together with the coded speech signal. In another embodiment, at least one test process condition is determined by an analysis of the received speech signal and an analysis of the current network channel. In step 354, a test voice characterizing parameter set is determined. Then, the determined at least one test process condition is compared with at least one standard enrollment process condition in step 356, and in the case of mismatch between the at least one test process condition and the at least one standard enrollment process condition, said mismatch is compensated in step 358 by using the correction parameters stored in the second database in relation to a mismatch value of the detected mismatch. Preferably, standard enrollment conditions are predetermined by the authentication server, and all stored enrollment voice characterizing parameter sets are normalized by the correction parameters to said standard enrollment conditions. Accordingly, the correction parameters are used for correcting, i.e. normalizing the determined test voice characterizing parameter set. Then, in step 360 the corrected test voice characterizing parameter set is compared with any of the stored normalized enrollment voice characterizing parameter sets, and match values are determined for each parameter set comparison. The best match value is selected and compared with an identification threshold value in step 362, and if the best match value successfully passes this comparison, it is determined that the speaker corresponds to the subscriber associated with the enrollment voice characterizing parameter set which produced the best match value. In step 364, the identification result can be transmitted similar to step 344 of FIG. 3B.

Figure 4:
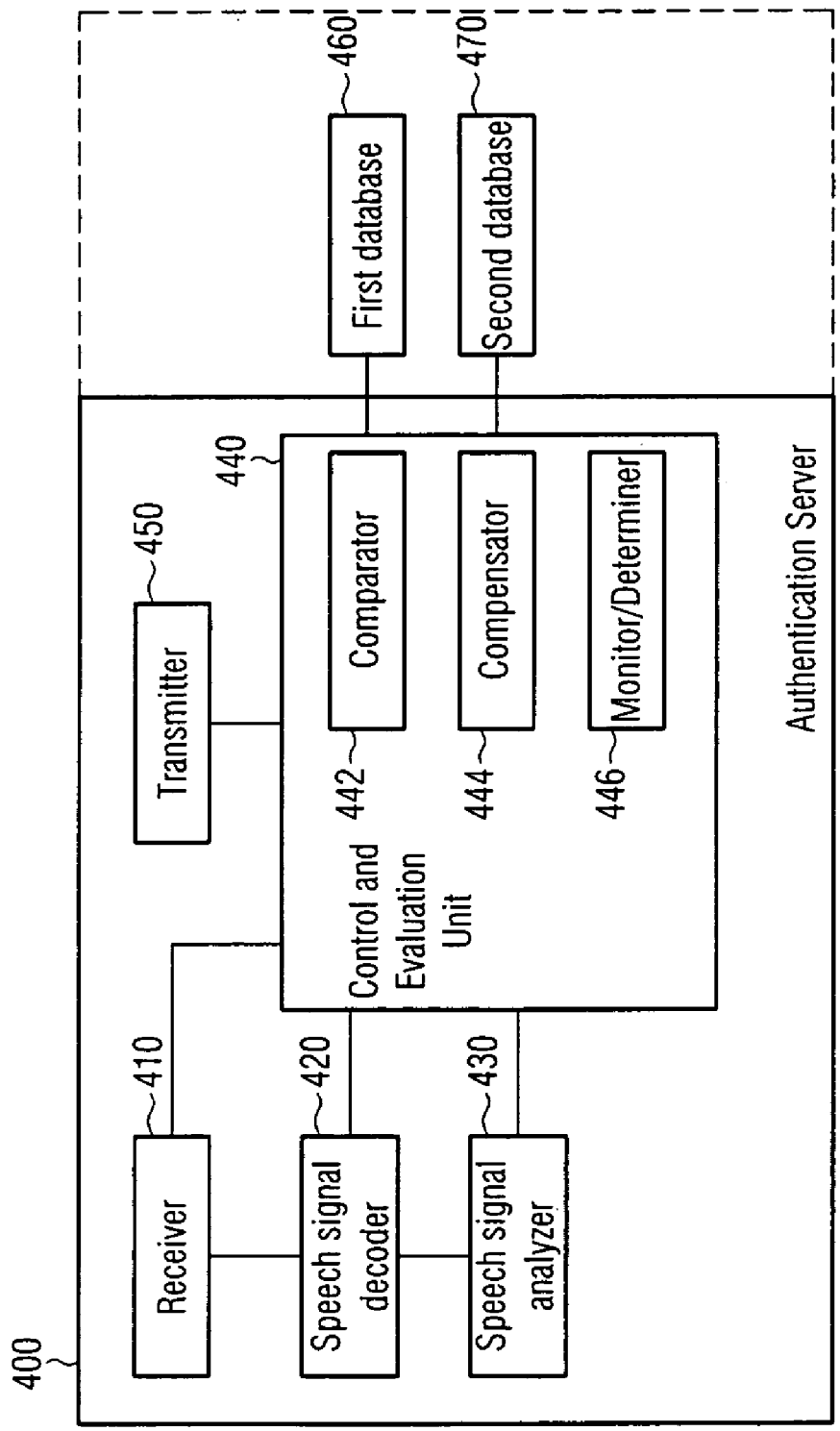
FIG. 4 represents a block diagram illustrating an exemplary authentication server in accordance with an exemplary embodiment.

Finally, FIG. 4 represents a block diagram of an exemplary authentication server 400 suitable for performing the above described techniques. The authentication server 400 comprises a receiver 410, a speech signal decoder 420, a speech signal analyzer 430, a control and evaluation unit 440 and a transmitter 450. The control and evaluation unit 440 comprises a comparator unit 442, a compensator unit 444 and a monitoring/determining unit 446. Furthermore, the authentication server 400 comprises or provides access to a first database 460 and a second database 470, wherein the first database 460 stores the enrollment voice characterizing parameter sets and the second database 470 stores the correction parameters and/or correction models used by the compensator unit 444 for compensating mismatch as described in detail above. The control and evaluation unit 440 controls all components of the authentication server 400 to enable the authentication server 400 to perform one or more of the above described techniques.

For example, in one embodiment, each enrollment voice characterizing parameter set in the first database 460 may be associated with one subscriber enrolled in the authentication server, being derived from at least one enrollment utterance spoken by said one subscriber during an enrollment process and being associated with at least one enrollment process condition indicating a condition during the enrollment process. The second database 470 stores the correction parameters for correcting a voice characterizing parameter set based upon on a mismatch between at least one enrollment process condition and at least one test process condition. The receiver 410 receives a coded speech signal over a network channel of the digital communication network. The decoder 420 decodes the coded speech signal. The monitoring/determining unit 446 determines at least one test process condition indicating a condition having influenced the received coded speech signal during the test process. The analyzer 430 determines a test voice characterizing parameter set from the decoded speech signal. The comparator unit 442 compares the determined at least one test process condition with at least one enrollment process condition to detect a mismatch between the at least one test process condition and the at least one enrollment process condition. The compensator unit 446 compensates for a detected mismatch using the corresponding correction parameters stored in the second database. The authentication server 400 may be further adapted in accordance with the above embodiments and aspects.

Note that instructions for enabling a computing device to perform one or more of the described methods may be provided on a computer-readable medium.

All of the above foreign patents, foreign patent applications and non-patent publications referred to in this specification and/or listed in the Application Data Sheet, including but not limited to European Patent Application No. EP 06007054.7, entitled "SPEAKER AUTHENTICATION IN DIGITAL COMMUNICATION NETWORKS," filed Apr. 3, 2006, is incorporated herein by reference, in its entirety.

From the foregoing it will be appreciated that, although specific embodiments have been described herein for purposes of illustration, various modifications, variations and improvements may be made without deviating from the spirit and scope of the present disclosure. For example, the methods and systems for performing speaker authentication discussed herein are applicable to other architectures. Also, the methods and systems discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.). In addition, those areas in which it is believed that those of ordinary skill in the art are familiar, have not been described herein in order to not unnecessarily obscure the techniques described herein. Accordingly, it is to be understood that the invention is not to be limited by the specific illustrative embodiments, but only by the scope of the claims.

The invention claimed is:

1. A method for an authentication server in a digital communication network environment, the authentication server having a first database for storing at least one enrollment voice characterizing parameter set, each enrollment voice characterizing parameter set being associated with one subscriber enrolled in the authentication server, being derived from at least one enrollment utterance spoken by said one subscriber during an enrollment process and being associated with at least one enrollment process condition indicating a process condition during the enrollment process, and a second database for storing correction parameters for correcting a voice characterizing parameter set based upon mismatch between at least one enrollment process condition and at least one test process condition, the method comprising the steps of:

receiving a coded speech signal over a network channel of digital communication network, the speech signal resulting from at least one spoken test utterance of a claimant claiming to be a certain subscriber enrolled in the authentication server, and decoding the coded speech signal;

determining at least one test process condition indicating a process condition having influenced the speech signal, wherein the at least one process condition comprises at least one network channel property of the digital communication network during a transmission of the coded speech signal;

determining a test voice characterizing parameter set from the decoded speech signal;

comparing the determined at least one test process condition with the at least one enrollment process condition associated with the stored enrollment voice characterizing parameter set of the certain subscriber the claimant claims to be; and when the comparing step results in a mismatch between the at least one test process condition and the at least one enrollment process condition, compensating effects of said mismatch by correcting the determined test voice characterizing parameter set or the stored enrollment voice characterizing parameter set with the corresponding correction parameters stored in the second database and that correct for the mismatch between the at least one test process condition and the at least one enrollment process condition.

2. A method according to claim 1 wherein the digital communication network is a packet switched network employing a voice over IP protocol or a mobile network.

3. A method according to claim 1 wherein each enrollment voice characterizing parameter set represents a voice feature set of acoustic features extracted from the at least one enrollment utterance, and each test voice characterizing parameter set represents a voice feature set of acoustic features extracted from the at least one test utterance.

4. A method according to claim 1 wherein each enrollment voice characterizing parameter set represents a set of model parameters of a speaker model derived from the at least one enrollment utterance, and each test voice characterizing parameter set represents a set of model parameters of a speaker model extracted from the at least one test utterance.

5. A method according to claim 1 wherein each enrollment voice characterizing parameter set represents a set of model parameters of a speaker model derived from the at least one enrollment utterance, and each test voice characterizing parameter set represents a voice feature set of acoustic features extracted from the at least one test utterance.

6. A method according to claim 1 wherein the compensating the effects of said mismatch comprises compensating effects of said mismatch by correcting the determined test voice characterizing parameter set with the corresponding correction parameters stored in the second database.

7. A method according to claim 1, further comprising:

comparing the parameters of the corrected test voice characterizing parameter set with the parameters of the enrollment voice characterizing parameter set, and determining a match value between the corrected test voice characterizing parameter set and the enrollment voice characterizing parameter set; and deciding whether or not the claimant corresponds to the claimed certain subscriber by comparing the determined match value with an authentication threshold value.

8. A method according to claim 1 wherein the at least one enrollment process condition is normalized according to a default enrollment process condition.

9. A method according to claim 1 wherein compensating the effects of said mismatch comprises compensating effects of said mismatch by correcting the enrollment voice characterizing parameter set with the corresponding correction parameters stored in the second database.

10. A method according to claim 9, further comprising:

comparing the parameters of the corrected enrollment voice characterizing parameter set with the parameters of the test voice characterizing parameter set, and determining a match value between the corrected enrollment characterizing parameter set and the test voice characterizing parameter set; and deciding whether or not the claimant corresponds to the claimed certain subscriber by comparing the determined match value with an authentication threshold value.

11. A method according to claim 1 wherein the receiving the coded speech signal further comprises receiving information on the at least one test process condition together with the speech signal, and wherein the determining the at least one test process condition comprises determining the at least one test process condition by analyzing the received information.

12. A method according to claim 11 wherein the at least one test process condition comprises a handset/headset label indicating the handset/headset used by the claimant during speaking the at least one test utterance, a signal-to-noise ratio of an analog/digital converter used for converting the at least one spoken test utterance to the speech signal, and a bit rate used by an encoder for coding the speech signal.

13. A method according to claim 1 wherein the at least one test process condition is determined by analyzing the received coded speech signal.

14. A method according to claim 13 wherein the at least one test process condition comprises a bit rate used for coding the speech signal.

15. A method according to claim 13 wherein a black box model out of a plurality of models for modeling combined influences of different test process conditions on a speech signal is selected in accordance with the analysis of the received coded speech signal and used for determining the at least one process condition.

16. A method according to claim 1, further comprising the steps of:

receiving from a remote device a request for using the authentication server to verify whether or not the claimant matches with the certain subscriber the claimant claims to be; and sending to at least one of the remote device or a second remote device a request for transmitting the coded speech signal.

17. A method according to claim 16, further comprising transmitting to the requesting remote device an indication of whether or not it is verified that the claimant matches with the certain subscriber the claimant claims to be.

18. A method according to claim 16, wherein the request for transmitting the coded speech signal includes one or more words to be spoken for the test utterance.

19. A method according to claim 18, wherein the one or more words to be spoken for the test utterance correspond to one or more words spoken for the enrollment utterance.

20. A method according to claim 18, wherein the one or more words to be spoken for the test utterance are randomly selected by the authentication server from one or more words spoken for the enrollment utterance.

21. A method according to claim 18, wherein the one or more words to be spoken for the test utterance are randomly generated by the authentication server.

22. A method according to claim 16, wherein the first database also includes at least one subscriber pass phrase for each subscriber and wherein the request for using the authentication server to verify whether or not the claimant matches with the certain subscriber the claimant claims to be further comprises at least one pass phrase, further comprising the step of determining whether or not the at least one pass phrase comprised in the request corresponds to the at least one subscriber pass phrase included in the first database for the certain subscriber the claimant claims to be.

23. A method according to claim 22, wherein the pass phrase represents at least one of a numeric personal identification number, an alphanumeric personal identification number, or a password comprised of a character string.

24. A method according to claim 22, wherein the authentication server sends the request for transmitting the coded speech signal only if the at least one pass phrase comprised in the request corresponds to the at least one subscriber pass phrase included in the first database for the certain subscriber the claimant claims to be.

25. A method according to claim 16 wherein a network address of the second remote device for sending the request for transmitting the coded speech signal is received together with the request from the first remote device.

26. A method according to claim 16, wherein the first database further comprises a network address of a second remote device for each enrolled subscriber, and wherein the network address of the second remote device for sending the request for transmitting the coded speech is determined from the first database.

27. A method according to claim 1, wherein the at least one spoken test utterance is randomly chosen by the claimant.

28. A method according to claim 1 wherein the one or more words spoken for the enrollment utterance are provided by the authentication server.

29. A method according to claim 1 wherein the one or more words spoken for the enrollment utterance are randomly chosen by the claimant.

30. A method for an authentication server in a digital communication network environment, the authentication server having a first database for storing a plurality of enrollment voice characterizing parameter sets, each enrollment voice characterizing parameter set being associated with one subscriber enrolled in the authentication server, being derived from at least one enrollment utterance spoken by said one subscriber during an enrollment process and being associated with at least one normalized enrollment process condition, and a second database for storing correction parameters for correcting a voice characterizing parameter set based upon mismatch between at least one normalized enrollment process condition and at least one test process condition, the method comprising the steps of:
receiving a coded speech signal over a network channel of a digital communication network, the speech signal resulting from at least one spoken test utterance of a speaker, and decoding the coded speech signal;
determining at least one test process condition indicating a process condition having influenced the speech signal, wherein the at least one process condition comprises at least one network channel property of the digital communication network during a transmission of the coded speech signal;
determining a test voice characterizing parameter set from the decoded speech signal;
comparing the determined at least one test process condition with the at least one normalized enrollment process condition; and
when the comparing step results in a mismatch between the at least one test process condition and the at least one normalized enrollment process condition, compensating effects of said mismatch on the test voice characterizing parameter set by the corresponding correction parameters stored in the second database.

31. A non-transitory computer-readable medium having contents stored thereon that enable a computing device to perform authentication by performing a method comprising:
receiving a coded speech signal over a network channel of digital communication network, the speech signal resulting from at least one spoken test utterance of a claimant claiming to be a certain enrolled subscriber, and decoding the coded speech signal;
storing a plurality of enrollment voice characterizing parameter sets, each enrollment voice characterizing parameter set being associated with one subscriber enrolled in the authentication server, being derived from at least one enrollment utterance spoken by said one subscriber during an enrollment process and being associated with at least one normalized enrollment process condition, and a second database for storing correction parameters for correcting a voice characterizing parameter set based upon mismatch between at least one normalized enrollment process condition and at least one test process condition, the method comprising the steps of:
receiving a coded speech signal over a network channel of a digital communication network, the speech signal resulting from at least one spoken test utterance of a speaker, and decoding the coded speech signal;
determining at least one test process condition indicating a process condition having influenced the speech signal, wherein the at least one process condition comprises at least one network channel property of the digital communication network during a transmission of the coded speech signal;
determining a test voice characterizing parameter set from the decoded speech signal;
comparing the determined at least one test process condition with the at least one normalized enrollment process condition; and
when the comparing step results in a mismatch between the at least one test process condition and the at least one enrollment process condition, compensating effects of said mismatch by correcting the determined test voice characterizing parameter set or the stored enrollment voice characterizing parameter set with stored corresponding correction parameters that correct for a mismatch between the at least one enrollment process condition and the at least one test process condition.

32. The computer-readable medium of claim 31 wherein the computer-readable medium is a memory of an authentication server.

33. The computer-readable medium of claim 31 wherein the contents are instructions that, when executed, cause an authentication server to perform the method.

34. An authentication server for a digital communication network environment, comprising:
- a first database for storing at least one enrollment voice characterizing parameter set, each enrollment voice characterizing parameter set being associated with one subscriber enrolled in the authentication server, being derived from at least one enrollment utterance spoken by said one subscriber during an enrollment process and being associated with at least one enrollment process condition indicating a process condition during the enrollment process;
- a second database for storing correction parameters for correcting a voice characterizing parameter set based on a mismatch value of a mismatch between at least one enrollment process condition and at least one test process condition;
- a receiver for receiving a coded speech signal over a network channel of a digital communication network;
- a decoder for decoding the coded speech signal;
- a determiner for determining at least one test process condition indicating a process condition having influenced the received coded speech signal, wherein the at least one process condition comprises at least one network channel property of the digital communication network during a transmission of the coded speech signal;
- an analyzer for determining a test voice characterizing parameter set from the decoded speech signal;
- a comparator for comparing the determined at least one test process condition with the at least one enrollment process condition to detect mismatch between the at least one test process condition and the at least one enrollment process condition; and
- a compensator for compensating for the detected mismatch by correcting the determined test voice characterizing parameter set or the at least one enrollment voice characterizing parameter set with the correction parameters stored in the second database in relation with a mismatch value of the detected mismatch.

* * * * *